United States Patent
Greenberger et al.

(10) Patent No.: US 11,062,331 B2
(45) Date of Patent: Jul. 13, 2021

(54) DETERMINING STREAMING CONTENT USER CONSUMPTION

(71) Applicant: International Business Machines Corporation, Armonk, NY (US)

(72) Inventors: Jeremy A. Greenberger, Research Triangle Park, NC (US); Zachary M. Greenberger, Research Triangle Partk, NC (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 16/380,139

(22) Filed: Apr. 10, 2019

(65) Prior Publication Data
US 2019/0311381 A1  Oct. 10, 2019

Related U.S. Application Data

(63) Continuation of application No. 15/231,410, filed on Aug. 8, 2016, now Pat. No. 10,373,179.

(51) Int. Cl.
*G06Q 30/02* (2012.01)
*H04L 29/08* (2006.01)
(Continued)

(52) U.S. Cl.
CPC ......... *G06Q 30/0201* (2013.01); *H04L 67/22* (2013.01); *H04L 67/306* (2013.01);
(Continued)

(58) Field of Classification Search
None
See application file for complete search history.

(56) References Cited

U.S. PATENT DOCUMENTS

| 7,813,822 B1 * | 10/2010 | Hoffberg | H04N 21/44222 700/94 |
| 2011/0161513 A1 * | 6/2011 | Viers | H04L 67/02 709/231 |

(Continued)

FOREIGN PATENT DOCUMENTS

| EP | 1641261 A2 | 3/2006 |
| WO | 2004088983 A2 | 10/2004 |
| WO | 2012120524 A2 | 9/2012 |

OTHER PUBLICATIONS

Tarzia et al., "Sonar-based measurement of user presence and attention", UbiComp 2009: Proceedings of the 11th international conference on Ubiquitous computing, Sep. 2009 (Year: 2009).*

(Continued)

*Primary Examiner* — Thomas L Mansfield
(74) *Attorney, Agent, or Firm* — Donald G. Weiss

(57) ABSTRACT

Confidence of attentiveness of a consumer of a media object on a media playback device is estimated by detecting a user action performed on a mobile computing device while or soon after the media objects are presented; responsive to the user action detection, retrieving descriptors for the media object; correlating the detected user action and the descriptors; if sufficiently correlated, determining a degree of confidence that the user is attentive to the media object; and recording the one user action, the media object descriptors, and the degree of confidence into digital results into computer memory.

20 Claims, 4 Drawing Sheets

(51) Int. Cl.
*H04W 4/029* (2018.01)
*H04W 4/02* (2018.01)
*H04L 29/06* (2006.01)

(52) U.S. Cl.
CPC .............. *H04W 4/02* (2013.01); *H04W 4/029* (2018.02); *H04L 63/107* (2013.01)

(56) References Cited

U.S. PATENT DOCUMENTS

| | | | |
|---|---|---|---|
| 2011/0202947 A1 | 8/2011 | Gupta et al. | |
| 2013/0110565 A1* | 5/2013 | Means, Jr. | G06Q 10/063 705/7.11 |
| 2013/0113993 A1 | 5/2013 | Dagit, III | |
| 2013/0308818 A1 | 11/2013 | MacIntosh et al. | |
| 2014/0181851 A1 | 6/2014 | Givon et al. | |
| 2015/0245090 A1* | 8/2015 | Davis | H04H 60/58 725/62 |
| 2015/0286464 A1* | 10/2015 | Yl | G06F 16/683 700/94 |
| 2015/0382075 A1 | 12/2015 | Neumeier et al. | |

OTHER PUBLICATIONS

Doughty, M.; "Who is on Your Sofa? TV Audience Communities and Second Screening Social Networks"; EuroITV 2012; ACM 971-104501-107-6/12/07 (Copyright 2012).

Nielsen; "Television Solutions", retrieved on May 15, 2016 from http://www.nielsen.com/us/en/solutions/measurement/television.html.

Smith, Aaron, et al; "The Rise of the 'Connected Viewer'"; Jul. 17, 2012; http://pewinternet.org/Reports/2012/Connected-viewers.aspx.

Brush, A.J. B., et al; "Recognizing Activities from Mobile Sensor Data: Challenges and Opportunities"; Copyright 2011 ACM 978-1-60558-431-7/09/09.

IBM; "IBM-Assigned Patent Applications to Be Treated as Related", dated Apr. 10, 2019.

* cited by examiner

DETERMINING STREAMING CONTENT USER CONSUMPTION

This is a continuation application of U.S. patent application Ser. No. 15/231,410, filed on Aug. 8, 2016, by Jeremy A. Greenberger, et al. This invention relates generally to methods and systems for determining, with a level of confidence, whether a user of a mobile device is attentive of streaming content such as a television broadcast, an online video, a radio broadcast, or an online audio channel.

BACKGROUND

It is valuable information to know if a user is actually attentive to a streaming media, such as a television station, online broadcast, or audio channel, or if the device receiving the streaming media is simply unattended. Proximity of the user to the receiving device is not entirely indicative of the user paying attention to the media, whereas the media may be being played to a window on a screen which is minimized or covered by another window, and/or the audio may be muted or played at a minimal volume.

The knowledge of what a user actually views or hears versus what he or she ignores is critical to many producers of media so that they can improve their products and services for increased consumer affinity.

SUMMARY OF THE DISCLOSED EXEMPLARY EMBODIMENTS ACCORDING TO THE INVENTION

The disclosed and illustrated exemplary embodiments according to the present invention estimate a confidence level of attentiveness of a consumer of a media object on a media playback device by detecting a user action performed on a mobile computing device while or soon after the media objects are presented; responsive to the user action detection, retrieving descriptors for the media object; correlating the detected user action and the descriptors; if sufficiently correlated, determining a degree of confidence that the user is attentive to the media object; and recording the one user action, the media object descriptors, and the degree of confidence into digital results into computer memory.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF EMBODIMENT(S) OF THE INVENTION

Problems Recognized

Figure 1:
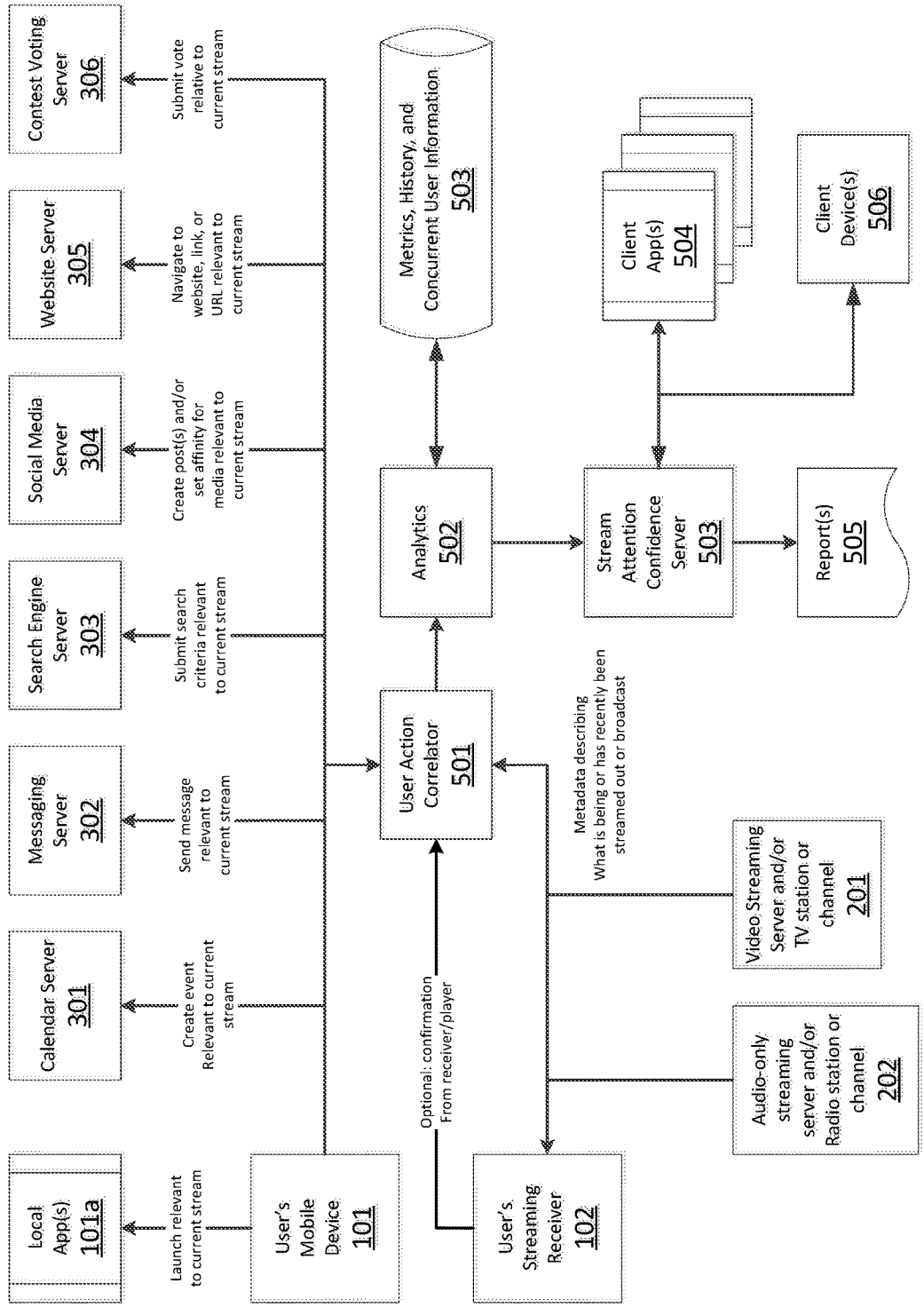
FIG. 1 illustrates an exemplary constellation of computers, processes, and data communications networks according to at least one embodiment of the present invention.

The inventors have recognized that, today, there are very few solutions to gain insight as to what a person is watching on a television at any given moment, or if they are watching at all. Just because a TV is on in a person's house, does not mean they are paying attention to the content or are interested. Accurately determining a person's viewing habits and preferences will enable development of immersive television viewing experiences. The embodiments of the present invention disclosed herein provide valuable improvements to the accuracy of several technologies used cooperatively during the determination of a consumer's viewing and listening patterns, habits, and preferences, such that the technologies themselves are improved through embodiment of the present invention.

General Principles of Operation

A First Class of Embodiments. The present inventors have realized that today's viewers and listeners to streaming media, including content transmitted over wired networks and wireless networks, alike, often interact electronically with other users, with other digital resources, or both, while actively watching or listening to the streaming media. For example, the inventors recognized that a user may send an instant message, such as a Twitter™ Tweet™, post a comment on a social media account, such as a Facebook™ account, or access a website or perform search for information, such as using Google™ or Wikipedia™. According to the inventors' realization, the nature of these user actions may or may not be related to the content of the current or recently streamed media, but if the nature of a user action can be determined to be related to the recently streamed media, then that is a strong indication that the user is paying attention to the streaming media. Further, if location determination such as Global Positioning System (GPS) or proximity beacons (e.g., Bluetooth Low Energy beacons) are incorporated to the system, additional confidence can be obtained about whether or not the user is actually paying attention to the streaming media.

As such, the present inventors have devised a solution to meet the unsatisfied needs in the art to determine not only whether or not a user is likely attentive to a streaming media, but also a confidence factor for that determination. The following several embodiments fall within the scope of the present invention, and as such, they are illustrations of various embodiments but do not limit the scope of the invention itself.

Generally speaking, embodiments according to the present invention monitor sources of media streams such as a television stations, an on-demand video source servers, a radio stations, and audio streaming service servers. Methods of monitoring the streaming content at such sources are well known, and are hereby incorporated into this disclosure. Many embodiments according to the invention will operate solely from metadata from the sources describing the media objects they are streaming or broadcasting (now or recently).

It is also possible in some embodiments to further confirm what is being received by users' streaming players, set top TV decoder boxes, etc. For example, some set-top cable television boxes can report or be polled as to their status (on or off) and what channel they are tuned to. Similarly, digital radios, such as some in-dash car radios, are capable of reporting the same status and tuning information, and many applications for mobile devices and computers for receiving personalized play lists and on-demand video source can report what is currently playing through the application, and some extensions and helper applications for web browsers can also report such connections and receiving status information.

However, just because a particular receiver reports that it is receiving a particular media object, it is still unknown if the user is actually attentive to the media object being played or rendered at the receiving device (e.g., many cable TV customers leave their cable decoder box turned on all the time and just turn of the TV).

Embodiments of the invention may utilize these and other available methods to gain insight into what media is currently being streamed, broadcasted, received (recently and presently).

A mobile computing device, such as a smart cell phone or tablet computer, which is associated with a user of the media playback device, is monitored for time-relevant user actions, such as current actions and/or recent actions taken by the user. Actions of interest include, but are not limited to, submitting search criteria to search engine websites and applications ("apps"), creating events in a locally-stored or remotely-stored electronic calendar, launching applications on the mobile device (e.g., related games, related retail sales applications, related poll taking applications, etc.), authoring new electronic messages or responding to received electronic messages (e.g., Short Message Service "text messages", multi-media messages, short messages such as "Tweets"™ and Instagrams™, and streaming messages such as Periscope™ and web chats), creating or responding to social media posts on social media servers or using social media apps, casting an electronic vote, visiting or navigating to a website or Uniform Resource Locator (URL), accessing another media object (e.g., video, music, app download), and initiating a telephone call.

There are a number of known mechanisms which can be employed by embodiments of the present invention to accomplish this user action monitoring, such as application programming interfaces (APIs) provided by some online servers to access user information in near real-time, similar APIs provided by mobile device operating systems that provide access to user activity, having the user add a monitoring portion of the embodiment to their "friends" list, and sharing the user's log in credentials with the monitoring portion of the embodiment. For example, at least two of the currently most popular social media online services provide application programs with a REpresentational State Transfer (REST) API for obtaining copies in near real-time of social media posts and/or instant messages authored, responded to, forwarded and read by a user. Various embodiments of the present invention may utilize any of these methods, as well as others which may become available or are currently available, in greater or less combination to accomplish the task of detecting user actions while the streaming media is being received by the media playback device.

Next, when the embodiment of the invention detects that a user action has been performed on the mobile device, the embodiment determines from the ascertainable descriptors of the currently-received media object at the media playback device if the action was relevant to a currently or recently transmitted or broadcast media object according to the source, and, optionally, confirmed as a received media object. This can be done in the first order by comparing meta-data descriptors for the media object to the meta-data and data of the user action, such as comparing the title and the names of the actors, singers or speakers of the media object to the website URL or content of a social media posting or message created by the user (or forwarded, or responded to, etc.). In a second order, more information can be obtained about the media object by the embodiment of the invention posting a query to an API for another computer service to provide more information, such as searching an internet movie database using some known meta-data descriptors about the media object to obtain additional descriptors about the media object (e.g., date of release, producer name, studio name, genre, etc.). In a third order of relevancy determination, embodiments of the invention may also perform advanced analysis or request advanced analysis to be performed on the media object to generate more descriptors, such as text-to-speech recognition on an audio stream or audio track of a movie, image recognition of faces, buildings, and object in frames of a video stream, etc. Embodiments of the present invention may utilize any or all of these and other available methods and technologies to obtain shallow to deep descriptive data about the media object being received (or recently received) by the media playback device.

Once a threshold of relevancy has been determined by one or more orders of comparison of descriptors for the media object with the one or more monitored and detected user actions on the mobile device, it is still not known with certainty if the user is actually paying attention to the received media object, or just potentially coincidentally performing some user actions which have some commonality (keywords, favorite websites, etc.). It is therefore an improvement beyond the presently available media consumer monitoring technology to determine a degree of confidence whether or not the user is actually paying attention to the current or recent media object on the media playback device.

According to the inventors' solution, if a user action is determined to be at least minimally relevant to the currently-received or recently-received media object, the embodiment of the invention proceeds to perform analytic analysis on various available metrics to produce a degree of confidence if the device's owner is attending to the data stream. For example, such metrics which can be employed in the analytic analysis can include but are not limited to an amount of time elapsed between when the media object (or a point within the media object) is transmitted to or received by the media playback device; the strength (strong, weak, neutral) of the relevancy of the user action to the descriptors of the media object (e.g., use of specific brand, actor or place names; use of specific movie, show, episode or song titles, etc.); a number of times a relevant user action has been performed; and how many other known associates (e.g., social media friends, the user's messaging contact list entries, etc.) are concurrently performing relevant user actions to the media object.

This determination of relevancy and degree of confidence is then provided to one or more reports, other client devices, and/or other client application programs, thereby enabling additional improvements and enhancements such as, but not limited to creating push notifications relative to the channel a person is watching, suggesting favorite types of shows/channels a person likes to watch, calculating how much television or radio a person consumes in a day, determining when a user typically watches television or consumes media objects, generating statistics on viewer demographics for companies that are tailoring advertisements to specific groups of users; and determining if nearby users are consuming the same media objects at the same time.

It should be noted that embodiments of the present invention can operate across many data streams (channels), such as a user switching between channels (serial consumption) or having multiple channels and media objects being played simultaneously (parallel consumption). The embodiment of the invention may provide some measure of the degree of confidence as to which of the several media objects are getting any or most of the user's attention, presuming that the media objects differentiate from each other in their descriptors.

An additional improvement to other services and technologies which are enabled by embodiments of the present invention is that the confidence degree measurement can assist other client devices and client applications to determine which position(s) within the media objects (movies, songs, lectures, discussions, advertisements, etc.) is/are most effective at generating user response and user action, which can lead to better insight as to which markets will create the best return on investment for brands, which arguments will generate the most persuasive response to users, and which scenes or chapters will become iconic of a media object.

A Second Class of Embodiments. Still further improvements in the technologies of measuring and determining viewership, readership and listener affinity and habits can be obtained in a second class of embodiments which utilize some or all of the functions and features of the foregoing first class of embodiments, but which also use location based services to further increase the confidence factor determination.

For example, if both the media playback device and the mobile device are the same physical device, then the locations of the two are known to be exactly the same. However, in many realistic scenarios, the media playback device (e.g., a cable set-top box or a digital radio) and the mobile device (e.g., a smart phone or a tablet computer) are not physically the same device, and one or both of the two devices may be relocated from time to time.

So, if the two devices are determined to be outside of proximity to each other, such as the user is away from home with his or her smart phone but left his or her cable box on and tuned to a particular channel back at their home, then the degree of confidence that the user is actually paying attention to the received media content on the cable TV receiver is lessened. Conversely, if the two devices are determined to be within a certain proximity, physical or geographical, of each other, then the confidence factor can be suitably increased accordingly.

A number of available technologies can be incorporated into embodiments of the invention in this second class to achieve this proximity determination and additional adjustment to the rendered confidence factor. For example, a global positioning position (GPS) reading for the user's mobile device can be compared to the geographical address known to be associated with user's cable television account where the cable TV receive set-top box is likely located. Or, internet protocol (IP) addresses and subnet addresses on a home, office, public or hotel network can be compared for both devices to see if they are connected to the same local area network or the same intranet. Other location based services technologies, such as proximity to a Bluetooth Low Energy beacon (BLE), can be utilized to see if both devices are within physical proximity of each other.

Using these location determination technologies, and optionally others, embodiments of the present invent may determine if the two devices are within a maximum proximity to each other, and if so, increase the degree of confidence value such as incrementing it or multiplying it by a location factor. Conversely, if the locations of the two devices are determined to be outside a minimal physical distance to each other, the embodiment of the invention may decrease the degree of confidence value such as decrementing it or dividing it by a location factor.

A Third Class of Embodiments. In still another group of embodiments according to the present invention, aggregation of actions across multiple users and comparison of those actions in real-time to known broadcast and streaming media metadata can yield viewership certainty on a group basis. For example, if a group of users who are demographically of an age group "young teens" are detected making one or more user actions (texting, posting, commenting, etc.) regarding a particular television show, then an embodiment of the invention may search metadata describing currently (and/or recently) broadcast and streamed media objects to find a correlation between the aggregation of the user actions and the metadata. In this class of embodiments, again, no actual data connections to the users' streaming players or broadcast receivers are necessary because additional certainty regarding the estimation of viewership is obtained by using a sufficiently large sample of users (e.g., a threshold of group size taking relevant user actions).

Specific Example Embodiments

Referring now to FIG. 1, a particular example embodiment of coordinated systems, methods and processes is shown. While the user's media object receiver (102) such as a cable TV box, a digital radio, or a streaming media device or app is receiving audio and/or video media content from a streaming server or broadcast station (201, 202), the user's mobile device (101) such as a smart phone or tablet computer is monitored for a user action by a user action correlator (501). Monitored and detected user actions can include any combination, but are not limited to, launching of one or more local application programs (101a) on the user's mobile device (101); creating, accepting, editing or modifying one or more events in a local or remotely maintained electronic calendar (301); sending, receiving, replying to, forwarding, or tagging an electronic message (302); submitting search criteria to a search engine (303) or database; creating, responding to, commenting on, reposting, forwarding, blocking, reporting, or deleting an entry in a social media account on a social media server (304) or through a local social media app; navigating to a particular website (305) or URL by direct browser address entry or selection of a hyperlink; and/or casting an electronic vote to a voting server (306) or via a local voting app.

When a user action such as these is detected during or soon after reception of a media object, the user action correlator (501) determines the relevancy of the user actions to the received media object as previously described, and if minimally relevant, then additional analytics (502) are performed as previously described using one or more additional metrics (503) to increase or decrease a confidence factor that the user is (or was recently) actually paying attention to the media object being played or rendered by the user's media playback device (102).

The results of the analytics are then posted by a confidence server (503) as one or more reports (505), such as machine-readable and/or human-readable outputs to printers, files, and displays. And, embodiments of the invention may provide electronic information via messages, database entries, or API responses to one or more client application programs (504) and/or one or more client devices (506) for further enhanced analysis as previously described.

Figure 2:
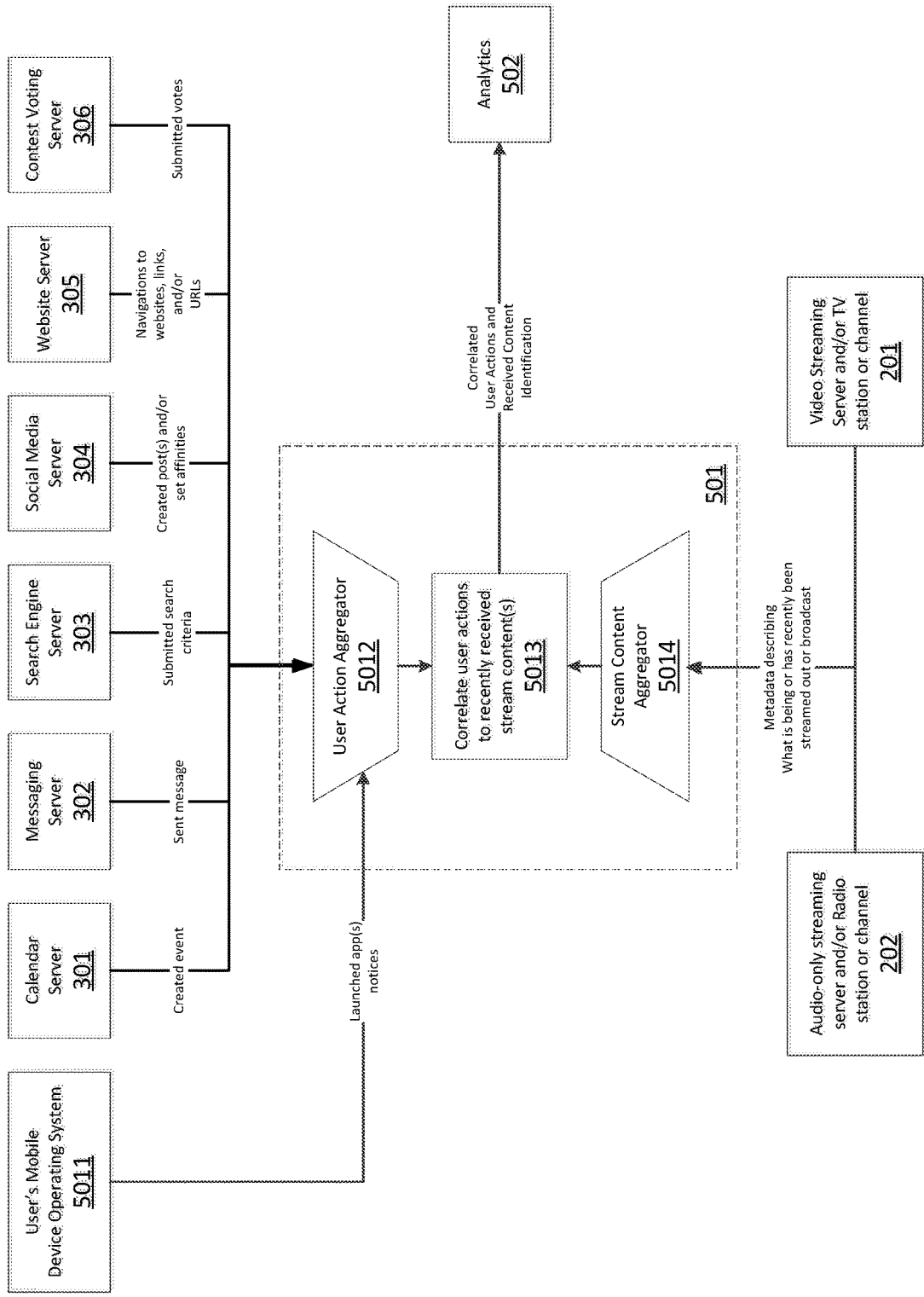
FIG. 2 illustrates an exemplary embodiment of a user action correlator according to at least one embodiment of the present invention.

Referring now to FIG. 2, additional details of an exemplary embodiment of a user action correlator (501) are shown, in which the monitored and detected user actions (301-306) are aggregated (5012), including optionally notices (5011) from the user's mobile devices operating system of launched application programs, and in which descriptors of the currently-streaming or recently-streamed media object(s) (201, 202) are also aggregated. These subjected to one or more correlation processes (5013) to each in a time-based manner, such as the methods previously described, and when a minimal correlation of at least one user action and one media object is detected, corresponding information about the relevant user action(s) and media object(s) is/are forwarded to the analytics portion (502) of the embodiment of the invention.

Figure 3:
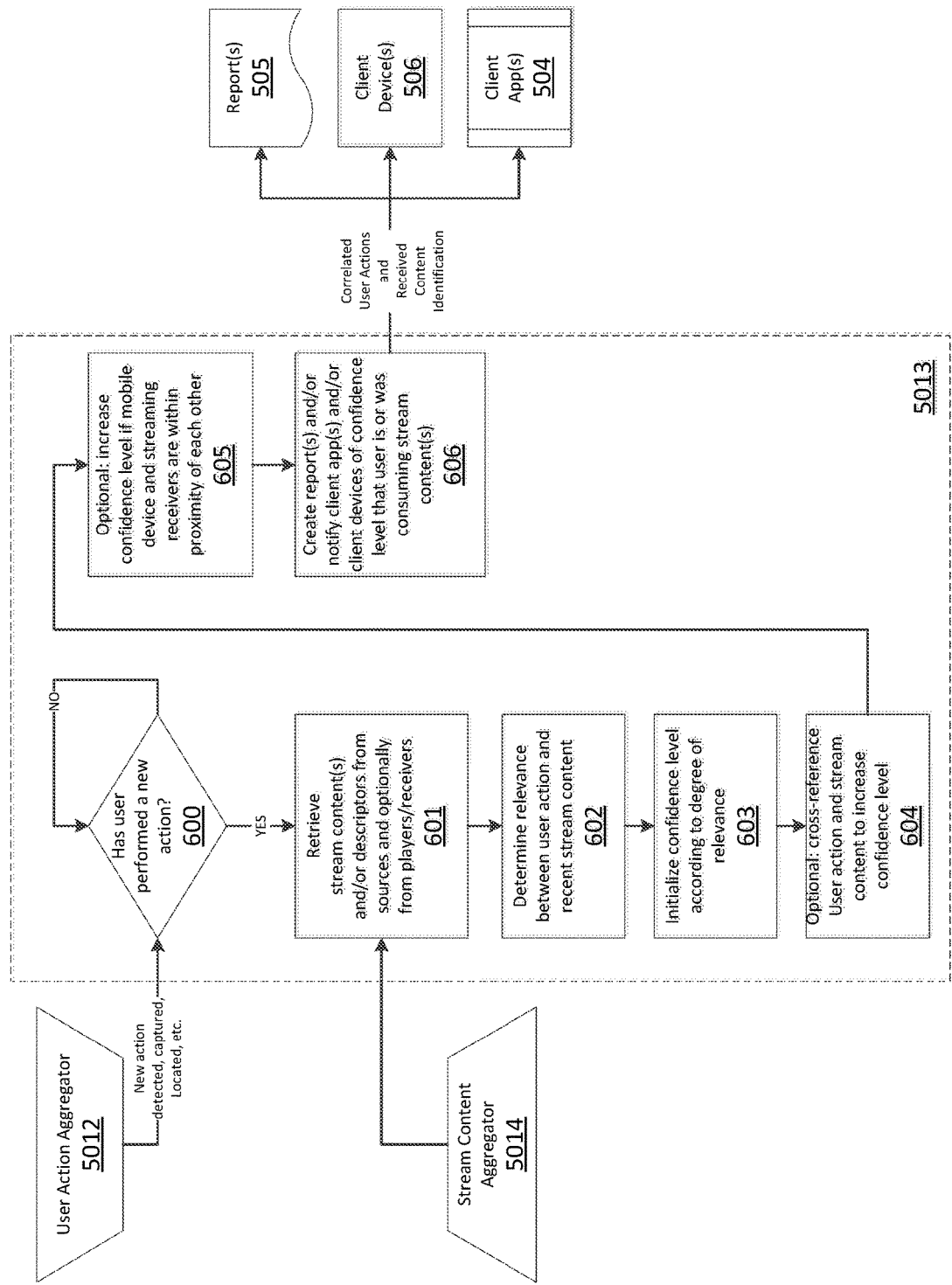
FIG. 3 illustrates an exemplary embodiment of correlation processes according to at least one embodiment of the present invention.

Now referring to FIG. 3, further details of an exemplary embodiment of the correlation processes (5013) is shown, in which the detected actions from the user action aggregator (5012) and the media object descriptor aggregator (5014) are received into the process (600, 601), and the initial relevance is determined (602) as previously described. The confidence level regarding the user's attention or inattention to the media object(s) is initialized (603), and it may be increased and decreased (604, 605) using one or more of the additional analytical phases or steps as previously described, including, optionally, consideration of user actions by additional known associate users (e.g., friends list entries, etc.) (605) and/or the location proximity analysis, also previously described.

Finally, reports (505) and/or output data structures such as messages, database entries, and push notifications to client devices (506) and/or application programs (504) are generated (606), including one or more pairs of correlated user actions and media objects with an associated degree of confidence for each pair.

It should be noted that data communications shown in FIGS. 1, 2 and 3 may include local area networks, intranets, an Internet, and one or more wireless networks, as appropriate for each specific embodiment, and that each embodiment uses the coordinated computer functions to improve the performance of the aforementioned viewership analysis systems and solves certain problems directly relevant to computer networks as described herein.

Hardware Product Embodiments. Embodiments according to the present invention may be realized in part or whole through electronic hardware circuitry, such as microprocessor-based circuitry, microcontroller-based circuitry, programmable logic arrays, custom circuits, and combinations thereof. Additionally, in the several figures, references to a "server" are to a hardware computer running one or more application programs which, together, perform the functions of a server computer. The several servers may be several distinctly separate computers running separate server application programs, or they may be combined into fewer hardware computer(s) which are capable of executing the functionality of multiple server application programs.

Figure 4:
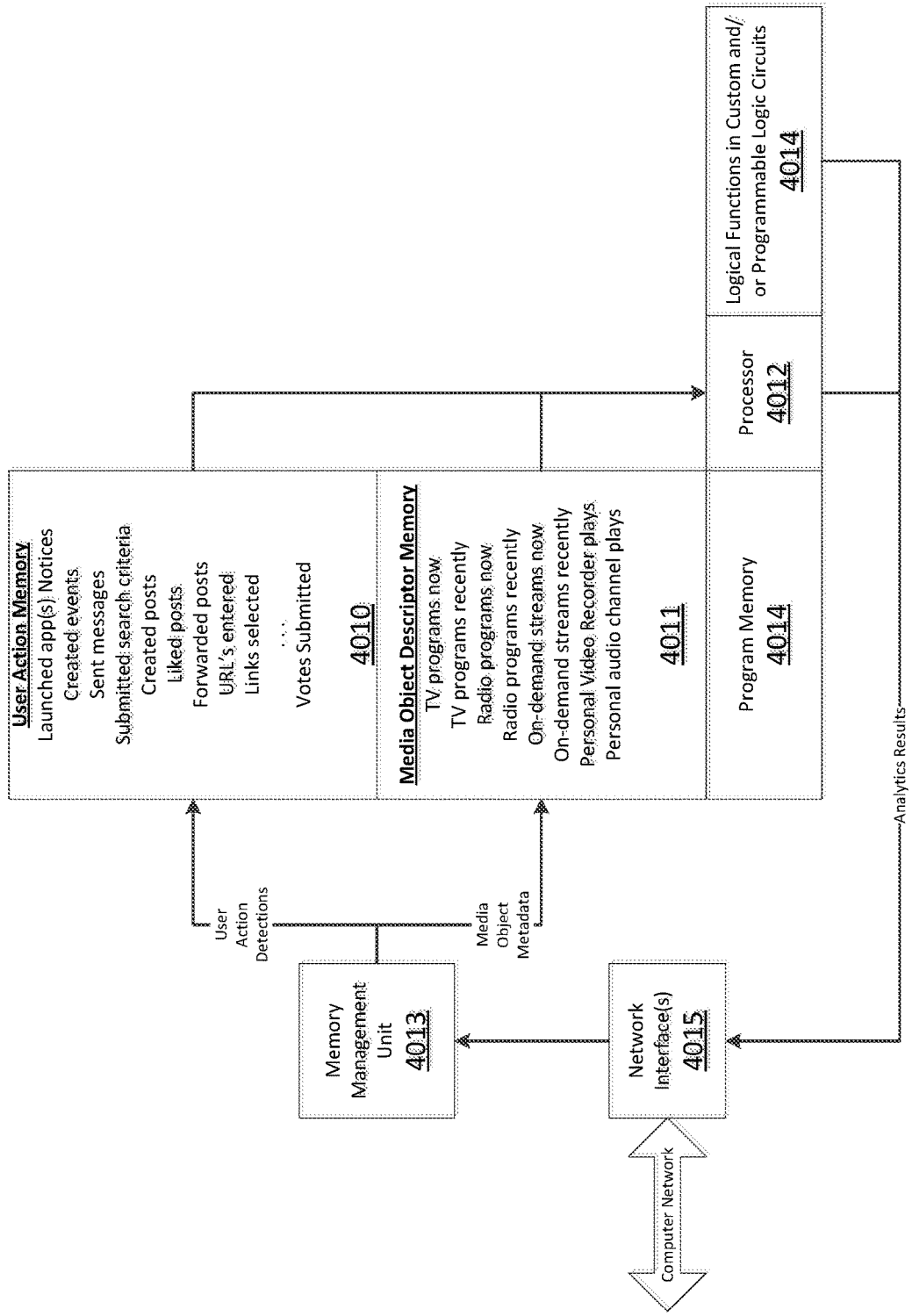
FIG. 4 depicts a computer-based embodiment according to the present invention.

Referring to FIG. 4, a computer-based embodiment according to the present invention is illustrated, in which one or more data and network interfaces (4015) (SCSI, PCI, IDE, Ethernet, WiFi, USB, cellular data, etc.) received detections of user actions and media object descriptions into system memory devices (4010, 4011, respectively), optionally enabled by a memory management unit (4013) (DMA controller, memory handler processor, etc.). One or more processors (4012) with program memory (4014) storing one or more program instructions coupled with optional functions committed to custom integrated circuits and/or programmable logic devices (PALs, PLDs, etc.) (4014) are configured to perform the logical functions described in the foregoing paragraphs. The results of the analytics performed by the processor (4012) and/or the logical functions (4014) are then transmitted to one or more client processes, client devices and/or reports via the data and network interface(s) (4015). As such, a specialized, processor-based implementation embodiment accomplishes the several objectives of the present invention.

Computer Program Product Embodiments. The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Conclusion. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process or processes.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method comprising:
    detecting, by a computer, a user action on a user device, wherein the detected user action is independent of one or more media objects transmitted via a computer network to the user device;
    retrieving, by a computer, from a media object server, one or more media object descriptors for the one or more media objects;
    determining, by a computer, a correlation of the detected user action to the one or more retrieved media descriptors;
    responsive to the correlation of the detected user action to the one or more retrieved media descriptors meeting a first threshold, determining, by a computer, a degree of confidence that the user is paying attention to at least one of the one or more media objects, wherein the degree of confidence that the user is paying attention is determined by performing analytic analysis on one or more available metrics, and further wherein the one or more available metrics include at least one of an amount of time elapsed between the reception of the media object on the media device and the user action, and a number of times the user action has been performed; and responsive to the degree of confidence that the user is paying attention to at least one of the one or more media objects meeting a second threshold, recording, by a computer, the user action, the one or more correlated media object descriptors, and the degree of confidence into one or more digital results in computer memory.

2. The method as set forth in claim 1 wherein the one or more media objects are transmitted to the user device by one or more transmission modes selected from the group consisting of currently streaming, currently broadcasting, recently streamed, and recently broadcasted.

3. The method as set forth in claim 1 wherein the media object server comprises one or more servers selected from the group consisting of a streaming media server and a broadcast server.

4. The method of claim 1 further comprising:
repeating, by a computer, the steps of detecting, retrieving, correlating, determining and recording for a plurality of users; and
wherein the determining of the degree of confidence comprises determining, by a computer, a degree of confidence that the plurality of users are attentive to at least one or more media objects.

5. The method as set forth in claim 1 wherein the detected user action comprises one or more user actions selected from the group consisting of launching a local application program on the mobile computing device, submitting search criteria to search engine website, submitting search criteria to search engine via a search engine application program, creating an event in a locally-stored electronic calendar, modifying an event in a locally-stored electronic calendar, accepting an event in a locally-stored electronic calendar, creating an event in a remotely-stored electronic calendar, modifying an event in a remotely-stored electronic calendar, accepting an event in a remotely-stored electronic calendar, authoring an electronic message, reading an electronic message, forwarding an electronic message, replying to an electronic message, initiating a streaming message, receiving a streaming message, joining a streaming message, forwarding a streaming message, responding to a streaming message, creating a social media post on a social media account, responding to a social media post on a social media account, reposting a social media post on a social media account, setting a reaction indication to a social media post on a social media account, deleting a social media post on a social media account, casting an electronic vote, visiting a website, visiting Uniform Resource Locator (URL), selecting a hyperlink, accessing an additional media object, and initiating a telephone call.

6. The method as set forth in claim 1 wherein the one or more transmitted media objects comprise at least one media object selected from the group consisting of a streaming video object, a streaming audio object, an online presentation, a broadcast television program, an electronic advertisement, and a broadcast audio program.

7. A computer program product comprising:
a tangible, computer-readable memory device which is not a propagating signal per se, accessible by a processor;
program instructions embodied by the memory device to cause the processor to, when executed, perform steps comprising:
detect a user action on a user device, wherein the detected user action is independent of one or more media objects transmitted via a computer network to the user device;
retrieve from a media object server, one or more media object descriptors for the one or more media objects;
determine a correlation of the detected user action to the one or more retrieved media descriptors;
responsive to the correlation of the detected user action to the one or more retrieved media descriptors meeting a first threshold, determine a degree of confidence that the user is paying attention to at least one of the one or more media objects, wherein the degree of confidence that the user is paying attention is determined by performing analytic analysis on one or more available metrics, and further wherein the one or more available metrics include at least one of an amount of time elapsed between the reception of the media object on the media device and the user action, a strength of the correlation of the detected user action to the one or more retrieved media descriptors, a number of times the user action has been performed, and a number of known associates of the user that are concurrently performing relevant actions to the media object; and
responsive to the degree of confidence that the user is paying attention to at least one of the one or more media objects meeting a second threshold, record the user action, the one or more correlated media object descriptors, and the degree of confidence into one or more digital results in computer memory.

8. The computer program product as set forth in claim 7 wherein the one or more media objects are transmitted to the user device by one or more transmission modes selected from the group consisting of currently streaming, currently broadcasting, recently streamed, and recently broadcasted.

9. The computer program product as set forth in claim 7 wherein the media object server comprises one or more servers selected from the group consisting of a streaming media server and a broadcast server.

10. The computer program product of claim 7 wherein the program instructions further comprise program instructions for causing a processor to:
repeat the detecting, retrieving, correlating, determining and recording for a plurality of users; and
wherein the determining of the degree of confidence comprises determining, by a computer, a degree of confidence that the plurality of users are attentive to at least one or more media objects.

11. The computer program product of claim 7 wherein the detected user action comprises one or more user actions selected from the group consisting of launching a local application program on the mobile computing device, submitting search criteria to search engine website, submitting search criteria to search engine via a search engine application program, creating an event in a locally-stored electronic calendar, modifying an event in a locally-stored electronic calendar, accepting an event in a locally-stored electronic calendar, creating an event in a remotely-stored electronic calendar, modifying an event in a remotely-stored electronic calendar, accepting an event in a remotely-stored electronic calendar, authoring an electronic message, reading an electronic message, forwarding an electronic message, replying to an electronic message, initiating a streaming message, receiving a streaming message, joining a streaming message, forwarding a streaming message, responding to a streaming message, creating a social media post on a social media account, responding to a social media post on a social media account, reposting a social media post on a social media account, setting a reaction indication to a social media post on a social media account, deleting a social media post on a social media account, casting an electronic vote, visiting a website, visiting Uniform Resource Locator (URL), selecting a hyperlink, accessing an additional media object, and initiating a telephone call.

12. The computer program product of claim 7 wherein the media object comprises at least one media object selected from the group consisting of a streaming video object, a streaming audio object, an online presentation, a broadcast television program, an electronic advertisement, and a broadcast audio program.

13. A system comprising:
a computer processor for executing program instructions;
a tangible, computer-readable memory device which is not a propagating signal per se, accessible by the processor;
program instructions embodied by the memory device to cause the processor to, when executed, perform steps comprising:
detect a user action on a user device, wherein the detected user action is independent of one or more media objects transmitted via a computer network to the user device;
retrieve from a media object server, one or more media object descriptors for the one or more media objects;
determine a correlation of the detected user action to the one or more retrieved media descriptors;
responsive to the correlation of the detected user action to the one or more retrieved media descriptors meeting a first threshold, determine a degree of confidence that the user is paying attention to at least one of the one or more media objects, wherein the degree of confidence that the user is paying attention is determined by performing analytic analysis on one or more available metrics, and further wherein the one or more available metrics include at least one of an amount of time elapsed between the reception of the media object on the media device and the user action, a strength of the correlation of the detected user action to the one or more retrieved media descriptors, a number of times the user action has been performed, and a number of known associates of the user that are concurrently performing relevant actions to the media object; and
responsive to the degree of confidence that the user is paying attention to at least one of the one or more media objects meeting a second threshold, record the user action, the one or more correlated media object descriptors, and the degree of confidence into one or more digital results in computer memory.

14. The system as set forth in claim 13 wherein the one or more media objects are transmitted to the user device by one or more transmission modes selected from the group consisting of currently streaming, currently broadcasting, recently streamed, and recently broadcasted.

15. The system as set forth in claim 13 wherein the media object server comprises one or more servers selected from the group consisting of a streaming media server and a broadcast server.

16. The system as set forth in claim 13 wherein the program instructions further comprise program instructions for causing a processor to:
repeat the detecting, retrieving, correlating, determining and recording for a plurality of users; and
wherein the determining of the degree of confidence comprises determining, by a computer, a degree of confidence that the plurality of users are attentive to at least one or more media objects.

17. The system as set forth in claim 13 wherein the detected user action comprises one or more user actions selected from the group consisting of launching a local application program on the mobile computing device, submitting search criteria to search engine website, submitting search criteria to search engine via a search engine application program, creating an event in a locally-stored electronic calendar, modifying an event in a locally-stored electronic calendar, accepting an event in a locally-stored electronic calendar, creating an event in a remotely-stored electronic calendar, modifying an event in a remotely-stored electronic calendar, accepting an event in a remotely-stored electronic calendar, authoring an electronic message, reading an electronic message, forwarding an electronic message, replying to an electronic message, initiating a streaming message, receiving a streaming message, joining a streaming message, forwarding a streaming message, responding to a streaming message, creating a social media post on a social media account, responding to a social media post on a social media account, reposting a social media post on a social media account, setting a reaction indication to a social media post on a social media account, deleting a social media post on a social media account, casting an electronic vote, visiting a website, visiting Uniform Resource Locator (URL), selecting a hyperlink, accessing an additional media object, and initiating a telephone call.

18. The system as set forth in claim 13 wherein the media object comprises at least one media object selected from the group consisting of a streaming video object, a streaming audio object, an online presentation, a broadcast television program, an electronic advertisement, and a broadcast audio program.

19. The method of claim 1, wherein the one or more available metrics includes a strength of the correlation of the detected user action to the one or more retrieved media descriptors.

20. The method of claim 1, wherein the one or more available metrics includes a number of known associates of the user that are concurrently performing relevant actions to the media object.

* * * * *